Nov. 15, 1966     C. E. CONTANT     3,285,716
ETCHED TANTALUM FOIL
Filed July 20, 1964
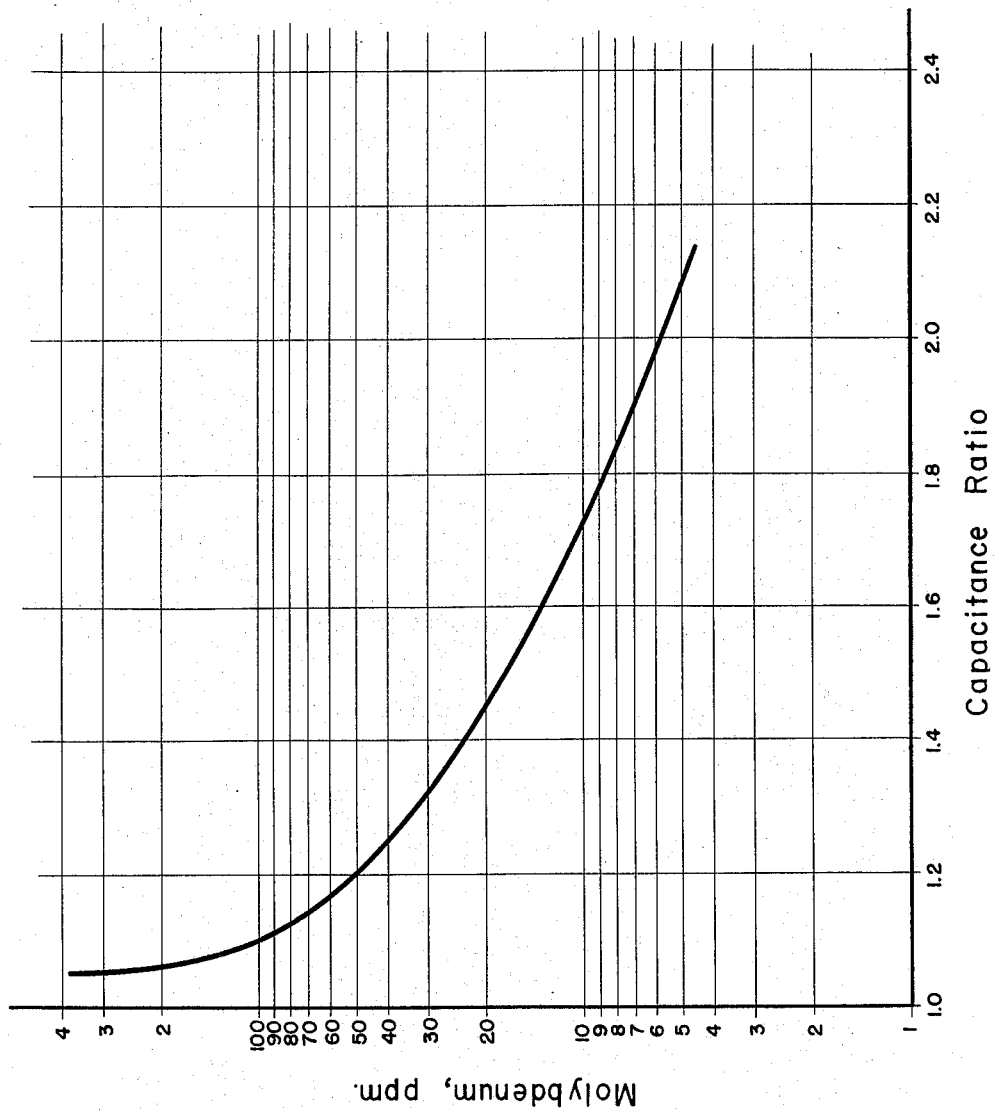
INVENTOR
Claude E. Contant
BY
ATTORNEYS

United States Patent Office 3,285,716
Patented Nov. 15, 1966

3,285,716
ETCHED TANTALUM FOIL
Claude E. Contant, Bechtelsville, Pa., assignor to Kawecki Chemical Company, Boyertown, Pa., a corporation of Pennsylvania
Filed July 20, 1964, Ser. No. 383,694
2 Claims. (Cl. 29—183)

This invention relates to tantalum foil and, more particularly, to surface etched tantalum foil characterized by a relatively stable capacitance over a wide range of temperatures.

Surface etched tantalum foil is used in making electronic capacitors. The foil is wound into the form of a coil so as to present, by its etched surface, an extensive surface for contact with an electrolyte in which the encapsulated coil is immersed. The electrical capacitance of the resulting capacitor is a function of the area of contact between the foil and the electrolyte, and consequently it is desirable to etch the tantalum foil as deeply as possible without procuring pinholes in the foil. The surface pits produced by such etching are relatively deep but narrow, and this characteristic appears to be responsible for the relatively low capacitance of tantalum foil capacitors at low temperatures compared to their capacitance at higher temperatures. The extent of this phenomenon is usually measured by comparing the capacitance of the foil at 125° C. with its capacitance at 25° C. in a conventional electrolyte, these capacitances generally having a ratio substantially greater than 2 to 1. It is a present theory that the reason for this difference in capacitance at substantially different temperatures is that the surface tension of the electrolyte changes and therefore causes the electrolyte to withdraw from the depths of the etching pits, and thus lessens the area of contact between the foil and the electrolyte, with a lowering of temperature. This variation in capacitance with temperature has characterized all grades of tantalum foil used for capacitors but, because higher purity of the tantalum leads to higher capacity, the variation of capacitance with temperature is more serious in the case of high capacity devices made from high purity tantalum.

It has now been discovered that when a controlled quantity of extraneous molybdenum is added to high purity tantalum, the resulting tantalum foil has a more nearly uniform capacitance over a wide range of temperature. Thus, the tantalum foil of the present invention is characterized, when surface etched, by a ratio of electrical capacitance at 125° C. to capacitance at 25° C. which is less than 2. This novel tantalum foil comprises high purity tantalum in which there is incorporated between about 35 and 300 parts per million of extraneous molybdenum.

The high purity tantalum which is used in producing the novel product of the present invention is that which contains not more than about 400 parts per million of total metallic impurities. Such tantalum contains less than about 100 p.p.m. of columbium and less than about 10 p.p.m. of indigenous molybdenum.

The extraneous molybdenum may be added to the tantalum powder or may be added as molybdenum-bearing tantalum scrap, or from other equivalent source. In the former case, the molybdenum is advantageously of high purity, although the very small amount of molybdenum used in practicing the invention introduces only a very small additional amount of impurities from the extraneous molybdenum. The molybdenum, when obtained from scrap tantalum, is generally present without significant amounts of other impurities. Such scrap can be used by hydriding it, then comminuting the brittle hydride, dehydrogenating the hydride powder, and adding this molybdenum-bearing tantalum powder to the high purity tantalum powder in amount such as to incorporate the desired effective amount of molybdenum in the tantalum ingot from which the foil is produced.

The amount of molybdenum added to the high purity tantalum pursuant to the invention is within the range of 35 to 300 parts per million. Within this range, 100 to 250 p.p.m. of extraneous molybdenum give highly satisfactory improvement in the capacitance ratio of the tantalum. The amount of extraneous molybdenum used in practicing the invention does not include, and has no relation to, any indigenous molybdenum in the high purity tantalum. Moreover, less pure tantalum containing an amount of indigenous molybdenum within the herein claimed range of extraneous molybdenum does not possess the low capacitance ratio characteristic of the tantalum product of the invention, apparently because the other impurities present in such relatively impure tantalum mask, or interfere with, the beneficial effect of extraneous molybdenum when added to high purity tantalum.

The molybdenum may be added to the tantalum in any manner compatible with the processing of the tantalum. High purity tantalum is almost universally produced first in the form of powder and is then transformed into ingot form by powder metallurgy technique, including vacuum furnace sintering or electron beam melting, or the like. Accordingly, the molybdenum, or the aforementioned molybdenum-bearing tantalum powder obtained from scrap tantalum, can be readily incorporated in the high purity tantalum by thoroughly mixing it in powder form with the tantalum powder and by then processing the resulting powder by conventional procedure for converting it to ingot form.

For the purpose of demonstrating the effectiveness of the added molybdenum in improving the stability of capacitance over a wide temperature range, the capacity of the etched tantalum was measured by conventional test methods using a standard tantalum foil capacitor electrolyte consisting of an ammonium pentaborate-glycol solution. In these tests, therefore, it is not the actual value of measured capacitance which is important, because this value in an actual capacitor is a function of the capacitor design, but it is the ratio of the measured capacitance at different temperatures which shows the capacitance stability of the tantalum foil with varying temperature. The two temperatures chosen for these tests are those widely used for this purpose, 125° C. and 25° C., and the capacitances at these temperatures, when compared in this order, yield a ratio, known as the "capacity ratio," which is more than 1.0 because the capacitance at the lower temperature is less than that at the higher temperature.

The following table shows the stability of capacitance with varying temperature, expressed as "capacity ratio," for the tantalum foil of this invention compared with high purity tantalum foil of the prior art. In the table, sample A is high purity tantalum foil containing less than 100 p.p.m. of columbium and about 5 p.p.m. of molybdenum as indigenous impurities determined by analysis of a sintered bar of the material before processing into foil. Samples B and C were prepared from the same high purity tantalum powder to which there was added sufficient extraneous high purity molybdenum powder, before forming into bars, to raise the molybdenum analysis of the bars to 37.5 p.p.m. and 250 p.p.m., respectively.

*Table I*

| Sample | Molybdenum Content, p.p.m. | Capacity Ratio |
|---|---|---|
| A | 5 | 2.07 |
| B | 37.5 | 1.42 |
| C | 250 | 1.10 |

The effect of the added molybdenum is also shown graphically in the accompanying drawing which represents a curve of values determined by actual tests, the curve showing values of analyses for molybdenum, starting with 5 p.p.m. indigenous to the aforementioned high purity tantalum, plotted against the capacitance ratio of 0.001 inch foil etched in an alcoholic solution of an inorganic halide. From this graph it is readily apparent that the capacitance ratio is significantly closer to unity than to 2 when the amount of added extraneous molybdenum is as high as about 35 p.p.m., and that the capacitance ratio approaches a minimum range of about 1.1 to 1.05 with additions of about 100 to 250 p.p.m. of molybdenum.

I claim:
1. Tantalum foil characterized, when surface etched, by a ratio of electrical capacitance at 125° C. to capacitance at 25° C. of less than 2 and comprising high purity tantalum in which there is incorporated between about 35 and 300 parts per million of extraneous molybdenum.

2. Tantalum foil characterized, when surface etched, by a ratio of electrical capacitance at 125° C. to capacitance at 25° C. of less than 2 and comprising high purity tantalum in which there is incorporated between about 100 and 250 parts per million of extraneous molybdenum.

References Cited by the Examiner
UNITED STATES PATENTS

| | | | |
|---|---|---|---|
| 2,451,703 | 10/1948 | Weiss | 148—133 |
| 2,917,419 | 12/1959 | Robinson | 148—133 |
| 3,156,560 | 11/1964 | Semmel | 75—174 |
| 3,183,085 | 5/1965 | France et al. | 75—174 |

DAVID L. RECK, *Primary Examiner.*

R. O. DEAN, *Assistant Examiner.*